Feb. 22, 1944.  R. O. WOOD  2,342,443
METHOD OF AND APPARATUS FOR REMOVING BURRS
AND FILMS FROM MOLDED ARTICLES
Filed May 29, 1941   2 Sheets-Sheet 1
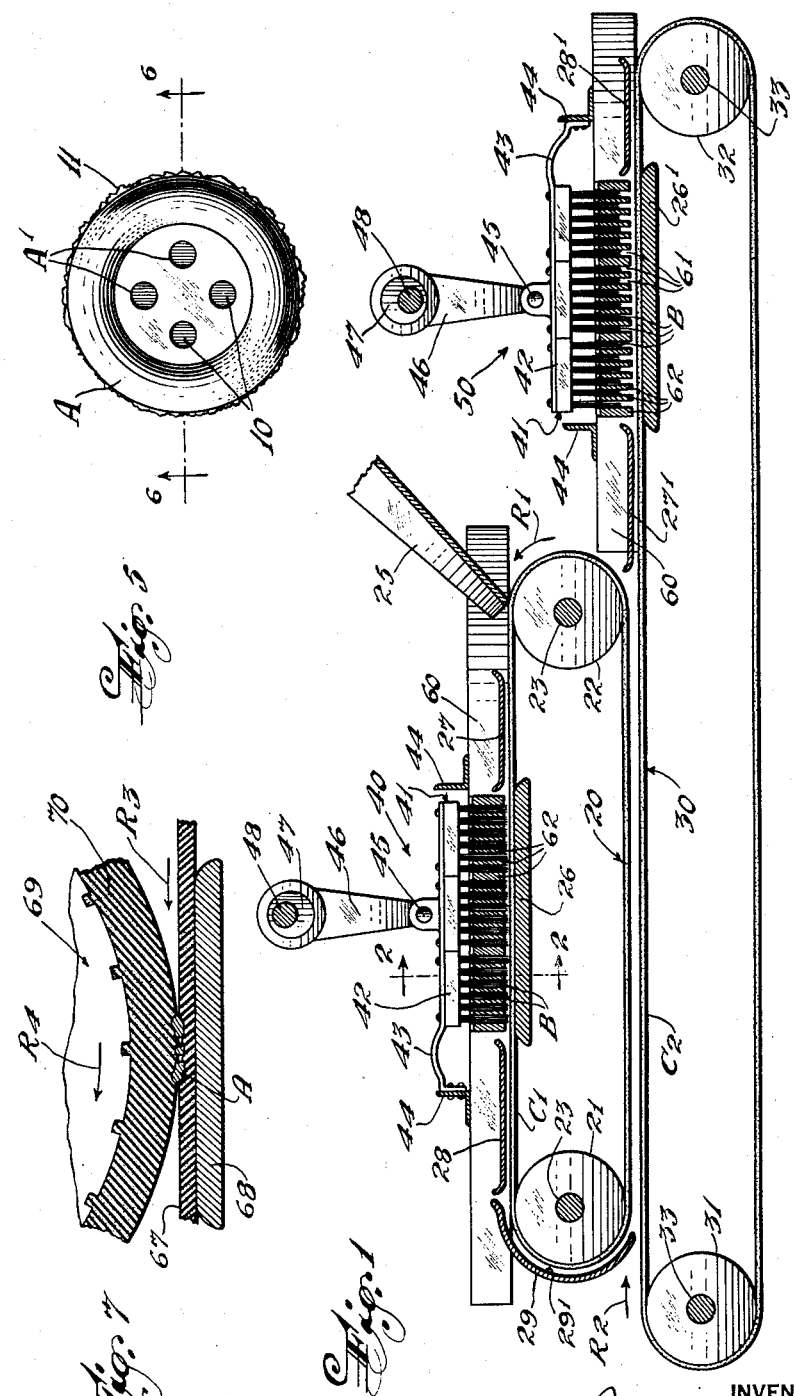
INVENTOR
Robert O. Hood
BY
Harry N. Cook
ATTORNEY

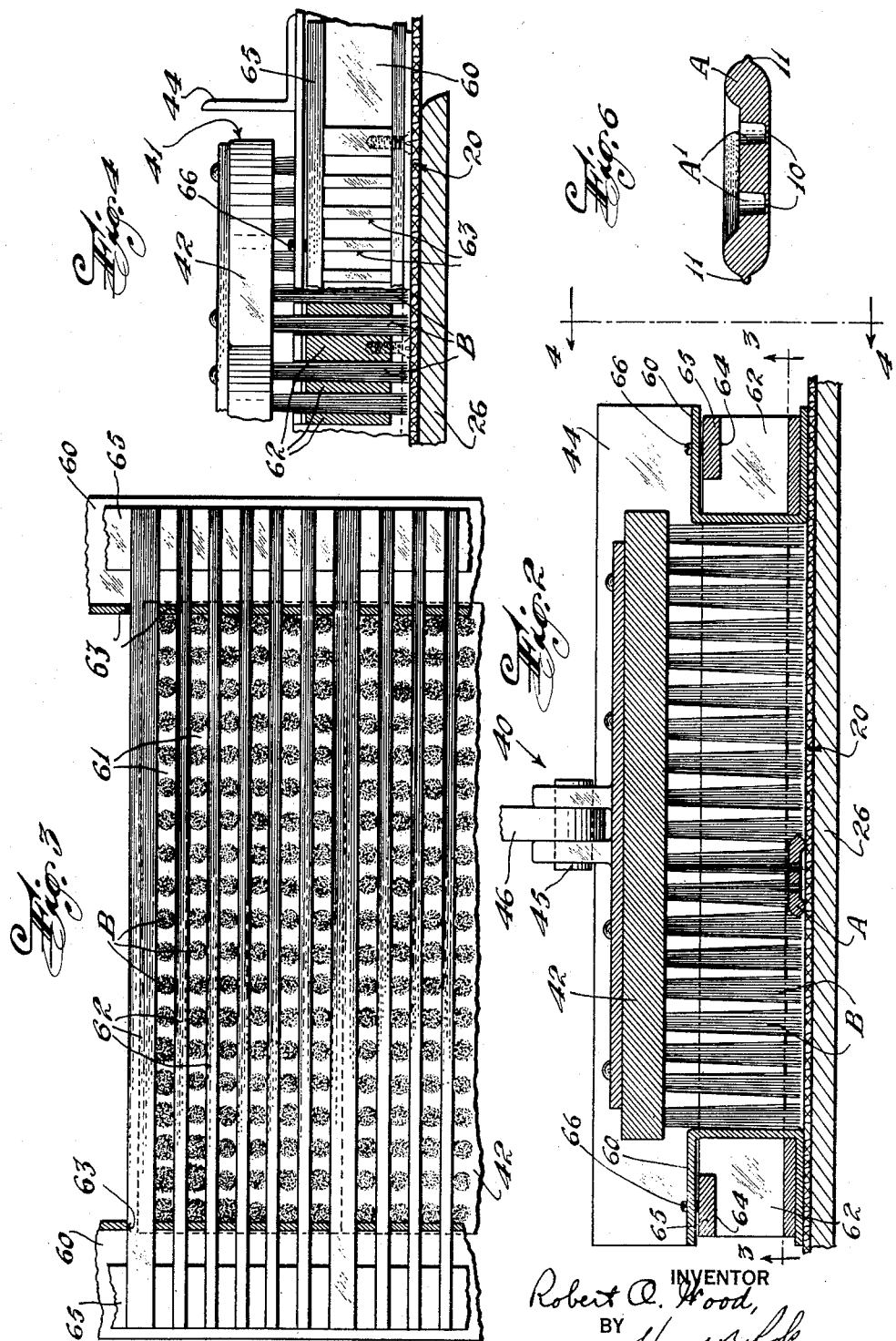

Patented Feb. 22, 1944

2,342,443

UNITED STATES PATENT OFFICE 2,342,443

METHOD OF AND APPARATUS FOR REMOVING BURRS AND FILMS FROM MOLDED ARTICLES

Robert O. Wood, Montclair, N. J., assignor to Button Corporation of America, Newark, N. J., a corporation of New Jersey Application May 29, 1941, Serial No. 395,772

16 Claims. (Cl. 18—1)

This application is a continuation in part of my copending application, Serial No. 333,539, filed May 6, 1940. The invention described and claimed in these applications relates to the production of molded articles, and is particularly directed to the removal of burrs and films remaining on articles which have been produced in compression molds, especially in the case of articles produced from thermosetting molding compounds, such as urea formaldehyde and/or phenol formaldehyde.

For well understood reasons, molders endeavor to produce a completely finished article in a single molding operation. Difficulties however are encountered in their attempts to attain this result, particularly because of the type of mold used, the kind of material employed and the form of the article being produced. This is well illustrated in the case of the production of buttons from a thermosetting material, such as mentioned above, by the use of compression molds. Although my invention is herein particularly illustrated in connection with the production of buttons, it is to be understood that the same is also applicable to the production of many other molded articles.

It is known in the art of molding, that a button may be produced by placing a predetermined amount of molding material or compound, between the dies of a two-part compression mold which, when subsequently closed, causes the material to take the shape of a button. The die means of such a mold usually consists of a pair of mated recessed sections. Where quantity production is desired, such mold is usually made in multiple or gang arrangement, that is with many such pairs of mated die sections, so that it may produce many buttons in one closing or cycling thereof.

Buttons are usually provided with a series of thread-holes, but it is very difficult to produce molded buttons, which when removed from the molds, will have thread-holes extending completely therethrough. To make a gang mold comprising a plurality of male die sections each having a series of thread-hole forming prongs or plungers all respectively accurately registering with apertures or recesses in the female die sections is so difficult and costly as to render commercial use thereof impracticable. Accordingly, some molders choose simply to mold buttons without thread-holes therein, in which event the drilling of these holes becomes a necessary subsequent operation. Other molders prefer, in order to eliminate the drilling operation, to employ molds having thread-hole forming prongs or plungers which extend from one die section into the other without the provision in the latter of corresponding apertures or recesses with which said prongs must register. Such a mold produces buttons having holes which extend almost through the buttons but in which a thin layer or film of the molded material remains at one end of each said hole. These molders then proceed to subject the buttons to treatments effective to break down or remove such unavoidable thin layers or films. Up to the present time, the treatments resorted to for this purpose have been unsatisfactory, particularly because of the long time required, which slows up production, and also because of detrimental effects on the buttons themselves.

It is a principal object of my invention to provide a new and improved method for effectively removing undesired mold fins, burrs, flashes or films from molded buttons and other molded articles.

It is a particular object of my invention to provide a novel method for removing the films which may remain in the holes of articles formed in molds having prongs or plungers for producing said holes.

It is a further object of my invention to provide novel apparatus for carrying out my improved method.

In general my invention contemplates the pressing of yieldable means against the articles so as to cause such means to engage the burrs and the films with sufficient force to break the same away from the main body portions of said articles. The yieldable means may comprise reciprocating members, for example devices having wire bristles, to apply a striking or impacting pressure upon the articles, and further objects of my invention are to provide novel and improved means for guiding the articles with respect to such yieldable means, and particularly to provide novel and improved means for holding the articles against rebounding under the blows or impacts applied by the yieldable means, for example to prevent the articles from becoming wedged between the bristles and to strip or remove the articles from the bristles during retracting movement of the bristles.

Another object of my invention is to provide such apparatus which is simple in construction and which requires a minimum of attention while in operation.

Other objects, features and advantages of my invention will appear from the following description, taken in connection with the accompanying drawings in which Figure 1 is a schematic vertical longitudinal sectional view of one form of apparatus embodying my invention.

Figure 2 is an enlarged fragmentary transverse vertical sectional view on the line 2—2 of Figure 1.

Figure 3 is a horizontal sectional view on the line 3—3 of Figure 2, looking in the direction of the arrows.

Figure 4 is a fragmentary side elevational view, partially in section, taken from the line 4—4 of Figure 2.

Figure 5 is a face view of a button which is to be treated according to the method and by the apparatus in accordance with my invention.

Figure 6 is a transverse vertical sectional view on the line 6—6 of Figure 5, and Figure 7 is a fragmentary sectional view of a modified form of apparatus.

While my invention is adapted for use in treating various kinds of molded articles, I have shown it specifically in conjunction with the treatment of molded buttons such as are shown in Figures 5 and 6 and designated A. As the result of the molding operation by which such buttons are produced, as above generally described, the button has thread holes A' at the smaller ends of which are thin layers or films 10 of the material of which the button is formed, which have been left as the result of the molding operation. The button also has a burr or flash 11 about the periphery or edge of the button that has been formed by the squeezing out of the excess molding material from the mating die sections during the molding operation.

My invention is directed particularly to the removal of such films 10 and burrs 11 before the buttons are completed or finished. Various treatments of said articles for the purpose of obtaining this result have heretofore been proposed. For example, it has been suggested that films at one end of the holes in such molded articles be removed by grinding; but this treatment requires individual chucking of the articles and is also open to the objections that it results in removing appreciable amounts of the main body portions of the articles being treated and, in the case of buttons or similar articles, necessitates subsequent "tumbling" of the articles for protracted periods in order to remove the grinding-tool marks from such articles and provide the latter with the desired smooth surfaces. Also in the case of molded buttons, tumbling of a loose mass of the buttons together with a quantity of pegs or other objects of substantial weight has been resorted to for the purpose of removing the said burrs and films; but this treatment, which causes the buttons to be subjected to attrition by reason of the rubbing action of the pegs or other objects thereon and of the buttons on each other, also to impact as the said pegs or objects strike thereagainst, is unsatisfactory for the following reasons: the pegs or other objects with which the molded articles are tumbled strike against the surfaces of the latter only in a haphazard manner, and even when a batch or mass of said articles is subjected to the treatment for a very long period, a considerable number of the films, at one end of the holes in these articles, will not have been effectively impinged by the said pegs or objects, and therefore in the case of each batch of articles thus treated, it is likely that at the terminal of the treatment there will be an appreciable percentage of such articles each with one or more of the said films still unremoved; and when the treatment is carried on for such a period of time as will ensure the removal of all or substantially all of the said films from the molded articles, then an appreciable and undesirable quantity of the material of the main body portions of all the treated articles is worn away or removed by attrition.

My invention provides a method and apparatus for subjecting a plurality of the molded articles simultaneously to the pressure of suitable yieldable means as above described, so that a great quantity of such articles can be treated in a comparatively short period of time. Preferably in accordance with my method, the articles being treated are moved in a given path past a certain point or points in which they are subjected to the pressure of the yieldable means; and the articles being treated are so moved and guided and the yieldable means is so actuated, as to ensure the engagement of each article by the yieldable means whenever the article is at any such certain point in its path of movement.

An important feature of my improved method consists in pressing the yieldable means against the articles being treated so that such means will bear against the main body of the article and will simultaneously forcibly engage and break away one or more of the undesirable films or burrs. The said method may be carried out either by subjecting simultaneously the opposite sides or surfaces of a button or similar article to the pressure of the yieldable means as described, or by first subjecting one side and thereafter the other side to such pressure. When the films or burrs are to be removed by a striking or impacting action as mentioned above, it is preferable to employ for the yieldable pressure applying means an assemblage of closely associated bristle-like elements; and when said films and burrs are to be removed by rolling pressure it is preferable to employ for the yieldable pressure applying means a body of resilient material such as soft rubber.

Figures 1 to 4 inclusive illustrate one form of apparatus which may be advantageously employed in carrying out in a preferred manner my improved method of removing the undesired films and burrs from buttons or similar articles molded as above described. Referring to these two figures, and particularly to Figure 1, the said apparatus comprises a belt conveyor system which includes two endless belts 20 and 30 disposed one above the other with the lower run of the belt 20 preferably spaced a slight distance above the upper run C2 of the belt 30. The belt 20 passes over and is supported by two spaced pulleys 21 and 22 which are respectively secured to two horizontal shafts 23 journaled in fixed bearings provided on suitable standards (not shown); and the belt 30 likewise passes over and is supported by two spaced pulleys 31 and 32 which are respectively secured to horizontal shafts 33 journaled in fixed bearings (not shown). The belt 30 is preferably considerably longer than the belt 20, and the belts are so arranged that the upper run C2 of the belt 30 extends a slight distance leftwardly beyond the pulley 21 for the belt 20 and a considerably greater distance rightwardly beyond the pulley 22. When the apparatus is in use, the belts 20 and 30 are continuously driven by any suitable driving means (not shown), preferably comprising an electric motor, so as to cause the upper run C1 of the belt 20 to move in the direction of the arrow R1 and the upper run C2 of the belt 30 to move in the opposite direction as indicated by the arrows R2.

The belts 20 and 30 are formed of any suitable material such as leather or canvas, and are of substantially the same width. Preferably these belts are of such width that they are adapted to accommodate transversely thereof a plurality of the buttons or like molded articles being treated when such articles lie flat on the belts without overlapping. Reference character 25 designates an inclined chute, preferably of substantially the same width as the belt 20, which may be connected at its upper end with a supply hopper (not shown) and is adapted to direct the articles to be treated from such hopper and discharge the same from its lower end onto the upper belt run C1 of the belt 20 adjacent the right-hand end of said run. In the operation of the apparatus, the buttons or other articles are preferably fed from the supply hopper at a rate sufficient to keep the conveyor system continuously supplied with substantially the maximum quantity of such buttons or articles which the apparatus is adapted to accommodate and effectively act upon.

Disposed just beneath the upper belt run C1 and substantially midway of its length, is a fixed backing plate 26; and overlying and spaced somewhat above said run are two fixed guard plates 27 and 28 which preferably terminate at their inner ends respectively directly above the right and left-hand end portions of the backing plate 26 and at their other or outer ends respectively short distances from the right and left-hand ends of the run C1. The plates 27 and 28 are preferably formed with upwardly curved end portions as shown. At the left-hand end of the run C1 there is provided an arcuate fixed guide member 29 which is disposed about the pulley 21 with its upper end spaced a short distance from the left-hand end of the plate 28 and with its lower end terminating just above the lower run C2 of the belt 30. This member 29 is curved outwardly at its upper end portion and is spaced somewhat from the pulley 21 to form a channel 29' which is adapted not only to guide the articles being treated in their transfer from the upper belt run C1 to the lower belt run C2, but also to cause such articles to be automatically turned over as an incident to such transfer. The plates 26, 27 and 28 and member 29 are preferably all of substantially the same width as the belts 20 and 30.

Associated with the upper belt run C1 and particularly with that portion thereof overlying the backing plate 26, is a preferred form of means, indicated generally by the reference character 40, adapted to remove by impingement or impact the undesired films and burrs from molded articles such as are described above. This means comprises a device 41 which is faced with yieldable material and which is adapted in the operation of the apparatus, to be moved downwardly and upwardly toward and away from the backing plate 26 and the overlying portion of the belt run C1 to cause such yieldable material forcibly to engage the upper exposed surfaces of any of the molded articles then disposed on said overlying belt portion in each downward movement of the device. The said device preferably consists of a brush-like member having bristled means as the yieldable facing material, and as shown comprises a back or holder 42 having secured thereto and extending downwardly therefrom a mass of closely associated and fairly stiff bristles B. The bristle support or holder 42 is secured as by screws, to the free end portion of a resilient arm or leaf-spring 43 which is suitably secured at its other end portion to a stationary horizontal cross bar 44 with which the apparatus is provided. Intermediate its ends the holder 42 is provided with an upwardly extending lug which is pivotally connected by means of a pin 45 to the lower end of a link or rod 46. The upper end of the rod 46 has a circular opening wherein is disposed an eccentric 47 carried by a shaft 48 which is journaled in fixed bearings (not shown) for rotation about a horizontal axis. The bristled face of the member 41 is of substantially the same width as the belt 20 and is slightly less in length than the spacing of the inner ends of the guide plates 27 and 28 between which it is moved up and down toward and away from the backing plate 26 as said member is vertically oscillated or reciprocated by the eccentric 47 through the connecting rod or link 46 when the shaft 48 is rotated. The amplitude of the vertical reciprocatory movement thus imparted to the bristle-faced member is dependent on the eccentricity or throw of the eccentric 47. Preferably the construction and arrangement are such that when the member 41 is at the lower limit of its said movement the ends of the bristles B will be substantially in contact with the belt 20 except at those points where they engage buttons or articles supported on said belt, and when the member 41 is at the upper limit of such movement the ends of said bristles will clear the buttons or articles which may be supported in a flat position on that portion of said belt which then overlies the backing plate 26.

The yieldable bristled face of the member 41 is preferably of such dimensions that it is adapted to overlie, both in the direction of its width and its breadth, a plurality of the molded articles when the latter lie flat and in non-overlapping relation on that portion of the belt run C1 which at the moment overlies the backing plate 26. Preferably the belts 20 and 30, in the operation of the apparatus, are driven at a uniform but comparatively slow speed, for example a speed on the order of forty feet per minute. The shaft 48, however, is at the same time preferably driven by suitable means, such as an electric motor (not shown) at a high speed such, for example, as will cause it to impart to the member 41 vertical reciprocations or oscillations on the order of several hundred a minute. Accordingly each button molded article as it is carried by the belt run C1 over the backing plate 26 and beneath the member 41, will be successively subjected to a considerable number of impacts or blows by the bristled face of said member. The bristles which thus strike the comparatively thick main body portion of any button (when buttons are being treated) will merely yield and be bent laterally, but the closely associated ends of those bristles which strike any of the above-mentioned thin burrs or films of the button will effectively break away and separate those undesired and relatively fragile portions from the main body portion of the button. The enlarged view of Figure 3 clearly illustrates the effect produced by the impacting or impinging blows of the member 41 on a button A when the latter is supported on the belt 20 with its rear face uppermost or exposed.

The guard plates 27 and 28, which are spaced from the belt run C1 only slightly more than the thickness of the buttons (or other articles) being treated, serve to maintain the buttons in a flat or horizontal position and in spaced or spread relation without overlapping on such belt run; and they also prevent the buttons from jumping up from the face of the belt 20 when struck by the member 41 at or adjacent the ends of their conveyance beneath said member and over the backing plate 26.

As the films 19 in the thread holes of buttons A molded in the manner above described are located at those ends of the holes which correspond to the rear faces of the buttons, the bristle-faced member 41 of the apparatus just described will effectively remove said films only from such of the buttons as are supported on the belt run C1 with their rear faces uppermost or exposed. It is possible to deliver the buttons onto the belt run C1 with the rear faces of all of them uppermost or exposed, and if this were done the apparatus above described and shown in Figure 2 would preferably be modified by omitting the guide member 29, the belt 30 with its supporting and driving means and of course the hereinafter described guard plates and striking or impact members associated with the belt run C2. However, to so deliver buttons to the belt run C2 would necessitate the use of an expensive hopper of special and complicated construction. However, I consider it preferable not to employ such a special hopper but simply to feed the buttons to the chute 25 and discharge them from the latter onto the upper run C1 of the belt 21 in a haphazard manner, with the result that some of the buttons on said belt run will have their rear faces uppermost and others will have their front faces uppermost. As indicated above, the striking means 40 is adapted effectively to remove the films from the thread holes of only such of the buttons as are supported on the run C1 with their rear faces uppermost. But as stated above, the buttons in passing through the channels 29' as they are transferred from the belt run C1 to the upper run C2 of the belt 30 are turned over, so that all the buttons carried on the run C1 with their front faces uppermost will be supported on the run C2 with their rear faces uppermost. Associated with the right-hand end portion of the belt run C2 beyond the pulley 22 are a backing plate 26', and two guard plates 27' and 28' which respectively correspond to the backing plate 26 and guard plates 27 and 28 and which are in the same positions and arrangements with respect to the said end portion of the belt run C2 as the latter plates are with respect to the belt run C1. Also associated with the right-hand end portion of the belt run C2, in the same manner as the striking means 40 is associated with the belt run C1, is a striking means 50. The two striking means 40 and 50 are identical in construction, and accordingly their respectively corresponding parts have been designated by the same reference characters. The shaft 48 of the striking means 40 and 50 may be driven by the same motor or by different motors, but are preferably driven at the same speed. Obviously the striking means 50 will effectively act on all buttons which are supported on the belt run C2 with their rear faces uppermost to break away and remove any films which may then be disposed at or adjacent the inner or rear ends of the thread holes in such buttons.

Another feature of the invention is the provision of means for guiding the buttons or other articles relatively to the bristles of the striking means 40 and 50 for holding the articles against rebounding under the blows or impacts applied by said striking elements and to prevent displacement of the articles from the conveyor belts 20 and 30.

One such means is provided for each striking means and comprises a frame that includes a pair of channel bars 60 mounted in a suitable manner above the upper run of the corresponding belt 20 or 30 with each bar extending longitudinally along one longitudinal marginal portion of the corresponding belt and in juxtaposition to the corresponding end of the respective striking means 40 or 50. As shown, each striking means has its bristles arranged in a plurality of parallel rows 61 extending transversely of the corresponding conveyor belt, as clearly shown in Figures 2 and 3. The bristles of each row 61 are confined in openings between two adjacent guide bars 62 that extend through the bristles and transversely of the conveyor belt with their ends extending through slots 63 in the bases of the respective channel bars 60. Any suitable means may be provided for holding the guide bars 62 in this position, and each bar may have a rabbet 64 in its upper edge at each end thereof in which is seated a locking bar 65 that is secured to the upper flange of the corresponding channel bar by screws 66. The guide bars 62 are spaced apart longitudinally of the conveyor distances less than the diameter of the buttons or other articles so that the dimensions of the openings between the guide bars are such that the articles cannot pass flatwise therethrough; and the lower edges of the guide bars are spaced from the adjacent run of the conveyor belt a distance somewhat greater than the overall thickness of the button or article, as shown in Figures 2 and 3.

With this construction, it will be observed that the buttons will be held by the lower edges of the guide bar 62 against rebounding under impacts from the striking means and also against turning over, so that there is no possibility of the buttons becoming wedged edgewise between the bristles and the buttons will be stripped or removed from the bristles during the retraction or upward movement of the striking means. The buttons will be held against displacement from the conveyor belt by the channel bars 60, the lower edges of which are in substantial contact with or slightly spaced from the adjacent run of the conveyor, as shown in Figure 2.

It will also be observed that the bars 62 will confine and guide the bristles so as to ensure effectual contact thereof with the buttons or other articles.

That form of apparatus shown in Figure 7 comprises a single belt 68 which is preferably an endless conveyor belt and is supported and driven by suitable means (not shown) in a manner similar to each of the belts 20 and 30 of the apparatus shown in Figure 1. That portion of the belt 68 illustrated corresponds to the central portion of the upper run C1 of the belt 20 in the apparatus shown in Figure 1, and is closely backed by a stationary rigid plate or platform 69 over which it moved in the direction of the arrow R3, when the apparatus is being operated. The belt 68 is preferably comparatively thick and at least the face portion thereof is formed of a suitable highly resilient material such as soft rubber. Associated with and disposed above that portion of the belt 68 which overlies the backing plate 69 is a pressure roller 70 which is provided with a facing 71 also formed of highly resilient material such as soft rubber. The roller 70 may be mounted for free rotation about a fixed horizontal axis (not shown), the construction and arrangement preferably being such that the face of said roller is adapted closely to engage the belt 68 at a point which corresponds to about the lengthwise central point of the backing plate 69. By reason of said engagement the roller 70 will be turned about its axis in the direction of arrow R4 by belt 68 as the latter is driven to move in the direction of the arrow R3.

In the operation of the apparatus shown in Figure 7, the buttons or other similarly shaped articles to be treated are merely delivered onto the moving belt 68 at some point to the right of the plate 69 in a haphazard manner, that is, without care or regard as to which sides or faces thereof may be uppermost. Such buttons or articles will then be carried by the belt first beneath and then beyond the resilient face 71 of the roller 70 as the latter is being turned about its axis by the belt as described above. When each such article in its said movement is located between the roller and belt, both faces thereof will be subjected to heavy pressure by the yielding resilient face portions of those cooperating members and any of the above-mentioned undesired burrs and films will be effectively broken away and removed from the main body portion of the article. For example, Figure 4 shows a button A so located and it will be apparent that the uppermost side of this button, which happens to be its front face, is being subjected to rolling pressure by the resilient face 71 of the roller 70 while the lower side of the button which happens to be its rear face, is being subjected to an equal pressure by the resilient face portion of the belt 68. The material of the resilient face portions of the belt and roller will yield and be displaced where it engages the main body portion of the button so as to conform to such body portion; but where it overlies the thread holes and the burrs at the edge of the buttons it will penetrate said holes and break away any films of the molding material therein and will bear against said burrs with said pressure as to break them off. It is thus apparent that the said burrs and films will be effectively removed in one passage of the buttons or other articles beneath the roller 70 regardless of which faces of the articles as supported on the belt 65 are uppermost.

The two forms of my improved apparatus described above are each adapted to treat a great quantity of buttons or like articles in a comparatively short period and are preferred embodiments. However, such apparatus are subject to many modifications within the scope of my invention. For example, the belt conveyors 20 and 30 and their supporting means could be omitted from the apparatus of Figure 1 and the buttons or articles simply placed on and removed from one or both of the plates 26 and 26' by hand or otherwise, though this would obviously result in a greatly reduced capacity. Also in the apparatus shown in Figure 7, the belt 68 and plate 69 could be replaced by a driving resiliently faced roller similar to the roller 70, but this too would, for obvious reasons, be a less desirable and efficient construction.

Having thus described my invention, what I claim is:

1. The method of treating a molded article comprising a body and having bonded to and extending from said body one or more thin and undesired portions of the molding material, which method consists in forcing bristled means against the surface of said article so that part of the bristles of said means will be caused to engage each of said thin portions and thereby break the latter away from said body.

2. The method of treating a molded article having opposite surfaces and comprising a body having bonded thereto and extending therefrom one or more thin and undesired portions of the molding material, which method consists in causing repeated striking contact of bristles endwise against one surface of the article so that said bristles impinge upon and break said thin portions away from said body.

3. The method of treating a molded article having opposite surfaces and comprising a body having bonded thereto and extending therefrom one or more thin and undesired portions of the molding material, which method consists in causing repeated striking contact of bristles endwise against said article so that certain of the bristles impinge upon one side of the article while other bristles pass over the edges of the article so as to break away said thin portions from said body.

4. An apparatus for operating on molded articles to remove therefrom thin undesired projecting portions of the molded material, comprising a conveyor having an approximately flat surface movable in a given path and adapted to support such articles, means for feeding and distributing such articles upon said flat surface of said conveyor, a device which has a face of yieldable material of an area greater than the aggregate of the areas of the exposed faces of a plurality of said articles and which is substantially bodily immovable in the direction of said path of movement, said device being mounted for movement toward and away from a predetermined point of said path of movement to cause said yieldable material forcibly to engage article supported by said conveyor when carried by the latter to said point.

5. An apparatus for operating on molded articles to remove therefrom thin undesired projecting portions of the molding material, comprising a conveyor movable in a given path a portion of which is horizontal for receiving and holding such articles so that they are free to move upwardly and laterally, a device located above said conveyer and having a yieldable portion reciprocable into and out of contiguous relationship to said conveyer at a given point in said horizontal portion of said path of movement so that such portion will strike the molded articles supported by said conveyer when brought by the latter to said point, so as to break said portions away from said articles.

6. An apparatus for operating on a molded article to remove therefrom thin undesired projecting portions of the molding material, comprising a conveyor having a section which is adapted to support such article and which is movable in a substantially rectilinear path, a device which has a face of yieldable material of greater area than the exposed surface of said article on said conveyor, said device being reciprocable in directions transverse to said path so that said yieldable face will impinge upon one side of said article and engage the edges of the article to break said thin portions away from the article, and means for driving said conveyor and for simultaneously imparting such reciprocatory movement to the last-named device.

7. An apparatus for operating on a molded article to remove therefrom thin undesired projecting portions of the molding material, comprising a conveyor having a section which is adapted to receive and support such article so that it is free to move upwardly and laterally and which is movable in a substantially rectilinear path, a device which has a bristled face of greater area than the exposed surface of said article on said conveyor, said device being cooperatively associated with said conveyor section and being mounted for reciprocatory movement in a direction transverse of said path so that certain bristles of said face will impinge upon one side of said article and other bristles will engage the edges of the article to break said thin portions away from the articles.

8. The apparatus set forth in claim 5 with the addition of means for guiding and holding said articles against rebound from the striking of said articles by said device.

9. The apparatus set forth in claim 5 with the addition of means for guiding and holding said articles against rebound from the striking of said articles by said device, said means comprising a frame having an opening through which said yieldable portion is reciprocated, said frame being spaced from said conveyor a distance slightly greater than the thickness of said articles and the dimensions of said opening being such as to prevent passage through it of articles disposed between said conveyor and said frame.

10. The apparatus set forth in claim 5 wherein said device has a plurality of said yieldable portions spaced from each other, and with the addition of a frame having an opening through which each of said yieldable portions is reciprocable, said frame being spaced from said conveyor a distance slightly greater than the thickness of said articles and the dimensions of said openings being such as to prevent passage through them of articles disposed between said conveyor and said frame.

11. The apparatus set forth in claim 5 wherein said yieldable portion of said device comprises a plurality of rows of bristles, and with the addition of bars between adjacent rows of bristles spaced apart a distance less than the diameter of said articles and spaced from said conveyor a distance slightly greater than the overall thickness of the articles for guiding and holding said articles against rebound from the striking of the articles by said device.

12. The apparatus set forth in claim 7 wherein said bristled face has a plurality of rows of bristles and with the addition of bars between adjacent rows of bristles spaced apart a distance less than the diameter of said articles and spaced from said conveyor a distance slightly greater than the overall thickness of the articles for guiding and holding said articles against rebound from the striking of the articles by said device.

13. The apparatus set forth in claim 5 wherein said yieldable portion of said device comprises a plurality of rows of bristles extending transversely of said conveyor and with the addition of side bars extending longitudinally of said conveyor and one at each of two opposite sides of said device to prevent displacement of said articles from the conveyor, and guide bars between adjacent rows of bristles and having their ends secured in said side bars, said guide bars being spaced apart a distance less than the diameter of said articles and spaced from said conveyor a distance slightly greater than the overall thickness of the articles for guiding and holding said articles against rebound from the striking of the articles by said device.

14. The apparatus set forth in claim 5 wherein said yieldable portion of said device comprises bristles, and with the addition of guide bars extending through said bristles transversely thereof and spaced apart a distance less than the diameter of said articles and spaced from said conveyor a distance slightly greater than the overall thickness of the articles for guiding and holding said articles against rebound from the striking of the articles by said device.

15. The apparatus set forth in claim 5 wherein said yieldable portion of said device comprises bristles, and with the addition of a frame having openings through each of which certain of said bristles are reciprocated, said frame being spaced from said conveyor a distance slightly greater than the thickness of said articles and the dimensions of said openings being such as to prevent passage therethrough of articles disposed between said frame and said conveyor.

16. Apparatus for operating on a molded button having a hole and a film of the molding material in said hole and also having a burr of molding material at its edges, said apparatus comprising a support for holding the article with one side up and its edges exposed, a device reciprocable toward and from said support and having a bristled face to strike said side of the button as said device moves toward said support said face being of an area greater than that of said side of the button so that certain of the bristles will enter said opening to break said film while other bristles will engage and break away said burr at the edge of the button.

ROBERT O. WOOD.